(12) United States Patent
Yamada et al.

(10) Patent No.: US 6,565,258 B1
(45) Date of Patent: May 20, 2003

(54) PLAIN BEARING

(75) Inventors: Tatsuo Yamada, Nagoya (JP); Toshiaki Kawachi, Nagoya (JP); Hideo Ishikawa, Nagoya (JP); Takayuki Shibayama, Nagoya (JP)

(73) Assignee: Daido Metal Company Ltd., Nagoya (JP)

( * ) Notice: Subject to any disclaimer, the term of this patent is extended or adjusted under 35 U.S.C. 154(b) by 65 days.

(21) Appl. No.: 09/665,672

(22) Filed: Sep. 20, 2000

(30) Foreign Application Priority Data

Sep. 29, 1999 (JP) ............................. 11-276224

(51) Int. Cl.⁷ ............................................. F16C 17/02
(52) U.S. Cl. ..................................... 384/276; 384/292
(58) Field of Search ................................. 384/291, 292, 384/288, 273, 294, 276

(56) References Cited

U.S. PATENT DOCUMENTS

| | | | | |
|---|---|---|---|---|
| 5,116,114 A | * | 5/1992 | Nakamura et al. .......... 351/205 |
| 5,238,311 A | * | 8/1993 | Katou et al. ................. 384/292 |
| 6,120,187 A | * | 9/2000 | Ono et al. ................... 384/273 |
| 6,273,612 B1 | * | 8/2001 | Ono et al. ................... 384/276 |

* cited by examiner

Primary Examiner—Lenard A. Footland
(74) Attorney, Agent, or Firm—Browdy and Neimark, P.L.L.C.

(57) ABSTRACT

In order to enhance the fatigue resistance and the anti-seizure property while maintaining the embeddability, there is provided a plain bearing comprising a bearing alloy layer, an intermediate layer and an overlay layer sequentially formed on the inner surface of a back metal. The inner surface of the bearing alloy layer is provided with a recess "a" and protrusions "b", thereby being made into a textured uneven surface. The protrusion has the shape of a oblique square at 45° relating to the circumferential direction, so that when a foreign particle X introduced between sliding surfaces of a shaft and the plain bearing is moved in the circumferential direction in accordance with the rotation of the shaft, the foreign particle X runs against a side edge of the protrusion "b" and moves along the side edge, thereby the embedding of the foreign particle X is promoted. If the foreign particle fails to be adequately embedded, the foreign particle leaves the side edge again.

7 Claims, 5 Drawing Sheets

CIRCUMFERENTIAL DIRECTION

PLAIN BEARING

BACKGROUND OF THE INVENTION

1. Field of the Invention

This invention relates to a plain bearing, and more particularly to a plain bearing having a bearing alloy layer of which the inner surface is formed as a textured uneven surface and coated with an overlay.

2. Description of the Related Art

There is known a plain bearing of the type in which a bearing alloy layer is bonded to a back metal and an overlay layer made of a soft material such as a Pb—Sn base alloy is provided on the inner surface of the bearing alloy layer so as to enhance the conformability and the embeddability for a foreign particle. There is also known a plain bearing of the type in which an intermediate layer made of Ni or the like is provided between the bearing alloy layer and the overlay layer so as to prevent components contained in the overlay layer from diffusing into the bearing alloy layer and enhance the bonding property of the overlay layer.

In those types of bearing, when the overlay layer is worn to the extent that the hard intermediate layer is exposed widely, a related shaft would directly slide on the hard intermediate layer and thus the seizure would be liable to occur abruptly. Therefore, there is also known a plain bearing of the type in which a plurality of recess grooves 64 are formed in the circumferential direction on the inner surface of the bearing alloy layer 61 by boring, and an intermediate layer 62 and an overlay layer 63 are further provided on the recess grooves 64, as shown in FIGS. 8 and 9, so that even when the overlay layer 63 is worn, the intermediate layer 62 and/or the bearing alloy layer 61 are not exposed widely but together with the soft overlay layer 63 filling the recess grooves 64 in an intermingled manner for maintaining the anti-seizure property.

SUMMARY OF THE INVENTION

However, since the recess grooves 64 formed by boring extend in parallel with each other in the circumferential direction, when a foreign particle X such as a chip or a deterioration product of lubricant is introduced between the shaft and the plain bearing during the operation, the foreign particle is frictionally moved in the circumferential direction while leaving a long scar (or damage) on the surface of the overlay layer. As a result, the anti-seizure property of the bearing is reduced, and the damage may cause the spread of a fatigue crack. Therefore, it has been impossible to provide a plain bearing excellent both in the anti-seizure property and the fatigue resistance.

Accordingly, it is an object of the invention to provide a plain bearing excellent both in the anti-seizure property and the fatigue resistance.

According to a first feature of the invention, there is provided a plain bearing of the type in which protrusions are formed on the inner surface of a bearing alloy layer so that when a foreign particle introduced between sliding surfaces of a shaft and the plain bearing is moved in the circumferential direction in accordance with the rotation of the shaft, the foreign particle runs against a side edge of the protrusions and moves along the side edge, and thereafter leaves the side edge again.

According to this feature of the invention, when a foreign particle is introduced between the sliding surfaces of the shaft and the plain bearing, the foreign particle is moved in the circumferential direction while being embedded in the soft overlay layer by the press of the rotating shaft. After that, the foreign particle runs against a side edge of one of the protrusions and moves along the side edge while being pressed against the side edge. This pressing force promotes the embedding of the foreign particle into the overlay layer. Thus, the foreign particle does not bite the side edge of the protrusions.

Moreover, in order to move the foreign particle along a side edge of the protrusions, it is necessary that the side edge is oblique at about 60° relating to the circumferential direction. While the side edge having a small oblique angle relating to the circumferential direction causes the foreign particle to move along the side edge easily, the embedding function of the plain bearing is reduced. Thus, it is desirable that the side edge is oblique at from 5° to 60°, preferably from 10° to 50°.

The bearing alloy may be made of a Cu alloy or an Al alloy, for representative examples. The overlay layer may be made of one selected from the group of Pb, a Pb alloy, Sn, a Sn alloy or a known sliding resin such as PTFE and PFA, for example.

Moreover, the bearing alloy layer may be directly covered with the overlay layer. Alternatively, the intermediate layer such as Ni and Ag may be provided between the bearing alloy layer and the overlay layer so as to enhance the bonding strength and prevent components contained in the overlay layer from diffusing into the bearing alloy layer, as a second feature. The intermediate layer may be made of one selected from the group of Ni, Ag, a Ni alloy, Cu, a Cu alloy, Co, a Co alloy, Sn, a Sn alloy, a Ag alloy, Zn and a Zn alloy, for example.

The overlay may be made of a lead-tin alloy, for a representative example. However, the overlay layer may be made of other soft material, such as a resin and a tin base alloy.

In the first feature of the invention, protrusions are arranged so that when a foreign particle introduced between sliding surfaces of a shaft and a plain bearing is moved in the circumferential direction in accordance with the rotation of the shaft, the foreign particle runs against a side edge of the protrusions and moves along the side edge, and thereafter leaves the side edge again, whereby there is provided a plain bearing excellent in the anti-seizure property and the embeddability for a foreign particle.

DESCRIPTION OF THE PREFERRED EMBODIMENTS

A preferred embodiment of the present invention will now be described in detail with reference to FIGS. 1 to 4. In this embodiment, the minimum oil film thickness (Hmin.) formed on the inner surface of a plain bearing half 1 in connection with a rotation shaft exists in the center in the circumferential direction (namely, in the lateral direction of FIG. 2). Thus, the inner surface of the plain bearing half 1 is made into a textured uneven surface (described below) within the angle range of 70° from the circumferential center line L (around the axis of the bearing) toward the respective circumferential end of the bearing so as to cover the area in which the minimum oil film thickness appears.

A method of producing this plain bearing half 1 will be described. In the method, a bimetal, formed by bonding a bearing alloy layer 2 of a copper alloy to a back metal (not shown), is cut into a predetermined size, and the bimetal piece is bent into a half-cylindrical shape by machining, and thereafter ends of the curved piece are processed, so that the plain bearing half 1 of a half-cylindrical shape having an outer diameter of 56 mm and a width of 26 mm is provided.

Next, the obtained plain bearing half 1 is subjected to degreasing by water cleaning, electrolytic degreasing, and pickling, in this order as pretreatment. Then, areas not to be etched are masked. In this embodiment, the masking is effected by pad printing using a masking material HER300 (Trademark) produced by OKUMURA SEIYAKU KOGYO K. K. in Japan.

As is well known, pad printing can provides various shapes as a pattern, while this embodiment adopts the pattern described below. A masking material for this pad printing is HER300 (Trademark) which is excellent in the acid-resistance and the alkali-resistance. The masking material HER300 (Trademark) is applied on the inner surface of the plain bearing except for area to be etched, the outer surface and the edge surfaces for coating those. After coating the whole plain bearing half 1 except for the etched areas, etching is carried out. More specifically, the plain bearing half 1 is immersed in an etching solution which contains nitric acid of 20 ml/l, hydrochloric acid of 20 ml/l and hydrogen peroxide of 20 ml/l and then, electrolytic etching is effected at a current density of 2 A/dm$^2$ at 20° C. for 10 minutes. As a result, the area which is not coated with the masking material is etched to form a recess groove "a" having a depth of 20 µm (see FIG. 4). On the contrary, the areas coated with the masking material are not etched and hence remain intact to form projections "b", so that the inner surface of the bearing alloy layer 2 turns into a textured uneven condition. The etching depth can be adjusted by changing the electrolytic etching condition appropriately. After the electrolytic etching, the plain bearing is rinsed by water so as to remove the masking material.

Figure 1:
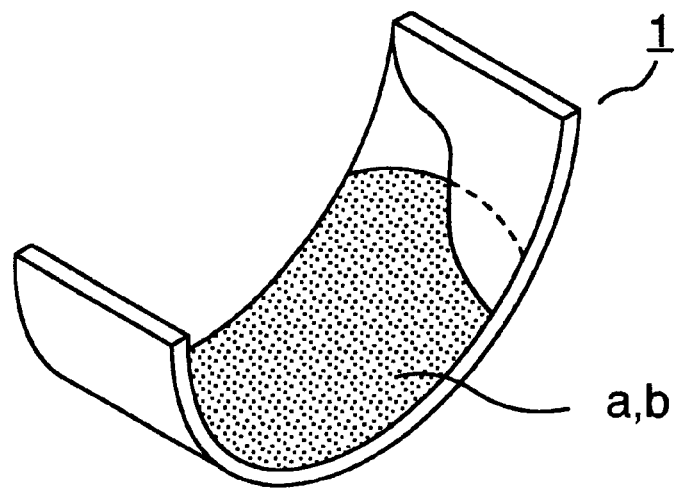
FIG. 1 is a partly-broken, perspective view of a plain bearing of the invention.
Figure 2:
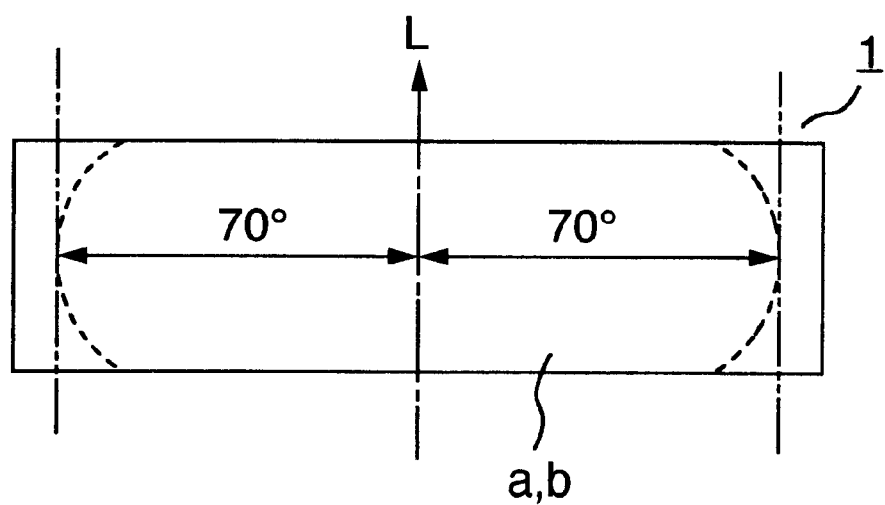
FIG. 2 is a developed view of the plain bearing.

Then, after electrolytic pickling, an intermediate layer 3 having a thickness of 1.5 µm is formed on the inner surface of the plain bearing by Ni plating so that the textured uneven surface of the bearing alloy layer 2 is covered by the intermediate layer 3. In the case, the intermediate layer 3 is formed in conformity with the contour of the textured uneven surface. Next, an overlay layer 4 having a thickness of 20 µm is formed on the intermediate layer 3 by plating of a lead-tin alloy. The obtained plain bearing is subjected to finishing machining, so that the plain bearing half 1 shown in FIGS. 1 and 2 is completed.

The inner surface of the bearing alloy layer 2 (see FIG. 4) made of a copper alloy is covered with the intermediate layer 3 made of Ni having a thickness of 1.5 µm, and the intermediate layer 3 is covered with the overlay layer 4 made of a lead-tin alloy having a thickness of 20 µm.

Figure 3:
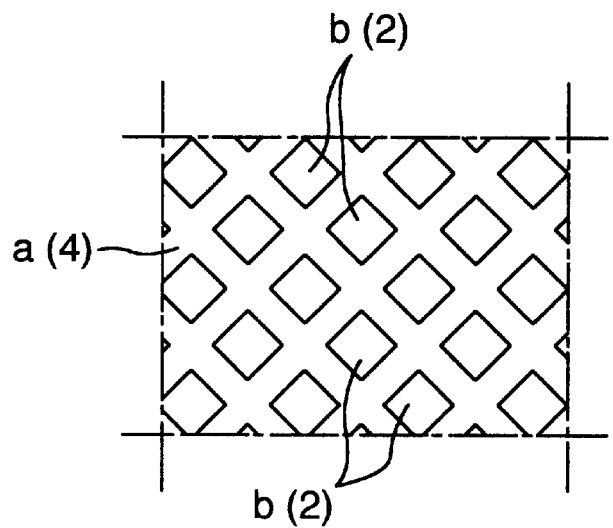
FIG. 3 is an enlarged plan view of a portion of the plain bearing, showing protrusions.
Figure 4:
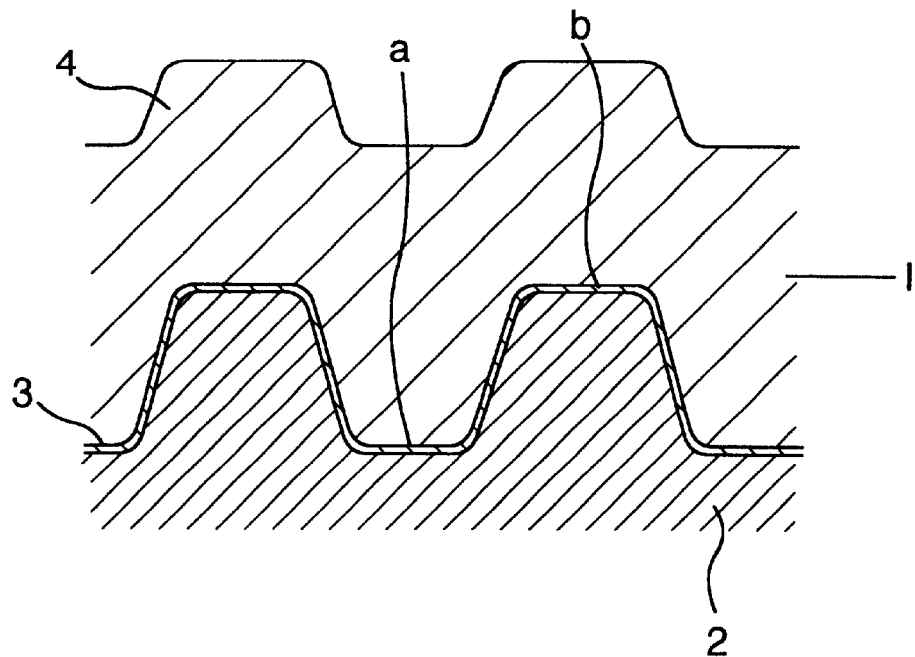
FIG. 4 is an enlarged, cross-sectional view of a portion of the plain bearing.

In this embodiment, as shown in an enlarged scale in FIG. 3, the protrusion "b" has the shape of a square with sides of 0.1 mm which are oblique at 45° relating to the circumferential direction. These protrusions are arranged at intervals of 0.15 mm in oblique lines relating to the circumferential direction so as to form a continuous pattern.

Figure 5:
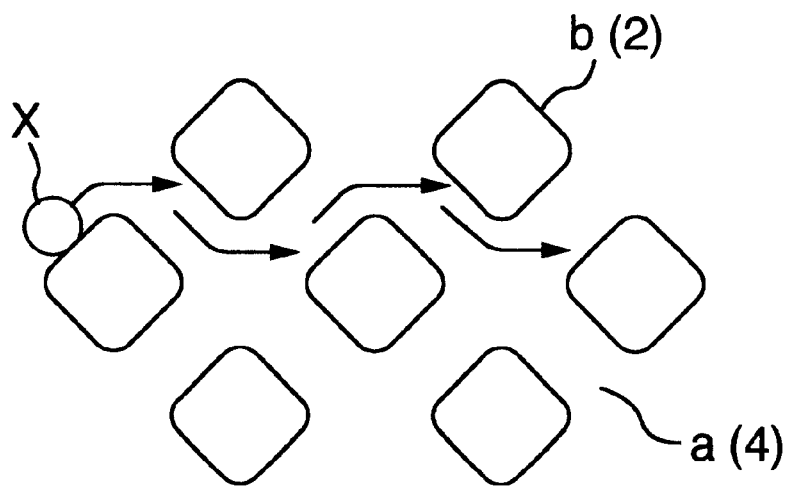
FIG. 5 is an enlarged plan view of a portion of the plain bearing for explaining the movement of a foreign particle.

This plain bearing 1 is mounted on a housing (not shown), and when an associated machine is operated, the overlay layer 4 is worn with the lapse of time. When the overlay layer 4 is worn to a level I (shown in FIG. 4), the bearing alloy layer 2 becomes exposed. At this time, since a shaft slides on the bearing alloy layer 2 at the projections "b" and the soft overlay layer 4 at the other portions, the bearing alloy layer 2 and/or the hard intermediate layer 3 will not be exposed widely, so that the seizure is prevented. In this situation, when a foreign particle X (see FIG. 5) is introduced between the plain bearing and the shaft, the foreign particle X is moved in the circumferential direction in the overlay layer 4 in accordance with the rotation of the shaft, and runs against a side edge of the protrusion "b". Since the side edge is oblique at 45° relating to the circumferential direction, the foreign particle X moves along the side edge while being embedded in the overlay layer 4. After that, when the foreign particle X moves to the corner of the side edge, the foreign particle X leaves there and moves in the overlay layer 4 again in the circumferential direction until hit against a next protrusion "b". When the foreign particle X moves along the side edge of the protrusion "b", the foreign particle X is more liable to be embedded in the overlay layer 4 as compared with the case where the foreign particle X moves through the overlay layer 4 in the circumferential direction, and therefore the foreign particle X is soon embedded in the overlay layer 4 and made in harmless, so that it is possible to prevent the overlay layer 4 from being much damaged. Moreover, the reason for the length of the side edge as 0.1 mm is that if the side edge is too much longer, the foreign particle X is kept pressed with the protrusion "b" for a long time, so that the seizure is liable to occur.

In this embodiment, even if a fatigue crack develops in the overlay layer 4, the fatigue crack is prevented from spreading since the recess "a" is surrounded by the protrusions "b". Thus, such a crack is limited to a small region.

Although one preferred embodiment of the invention has been described above in detail, the invention is not limited to this embodiment, but various modifications as described below for examples can be made without departing from the scope of the invention.

Figure 6:
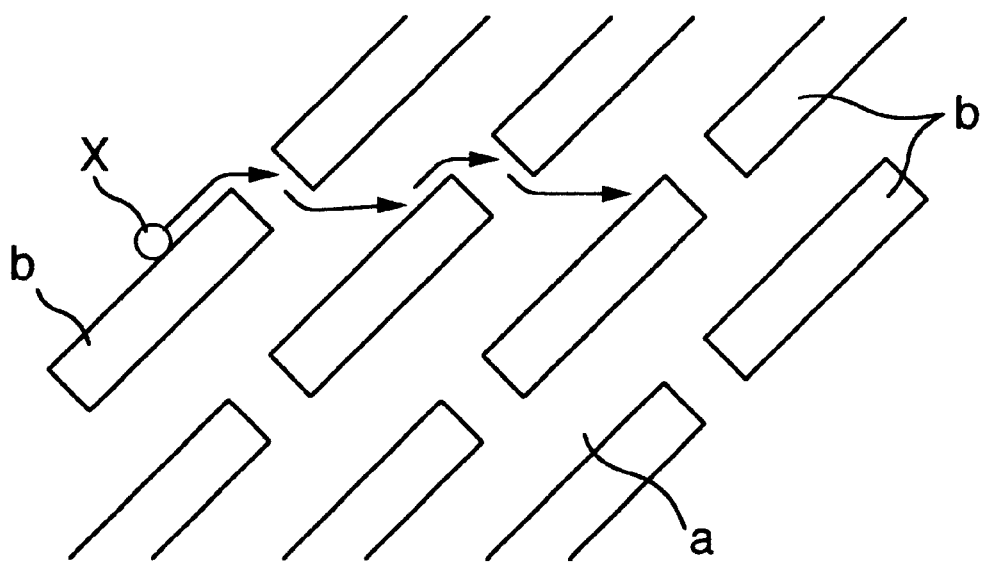
FIG. 6 is an enlarged plan view of a portion of a plain bearing according to further embodiment.
Figure 7:
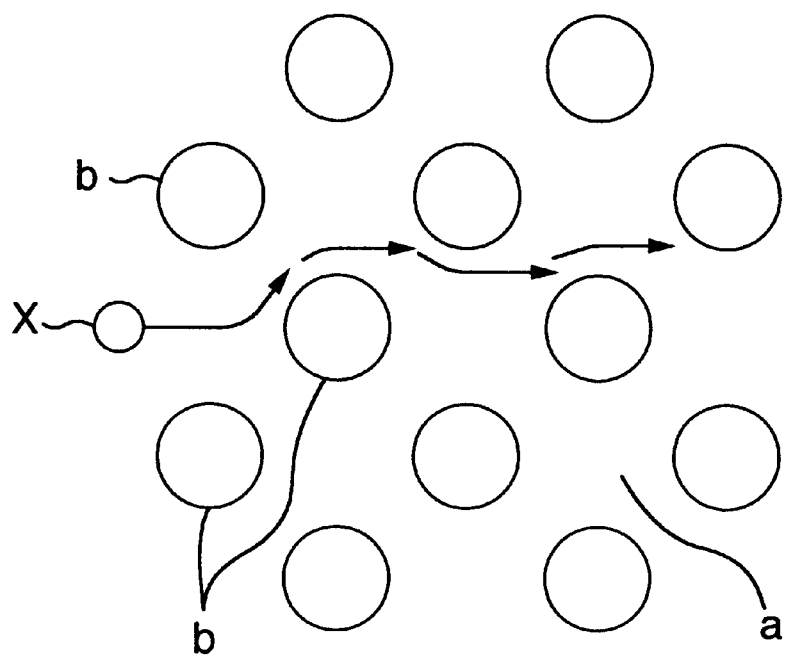
FIG. 7 is an enlarged plan view of a portion of a plain bearing according to still further embodiment.
Figure 8:
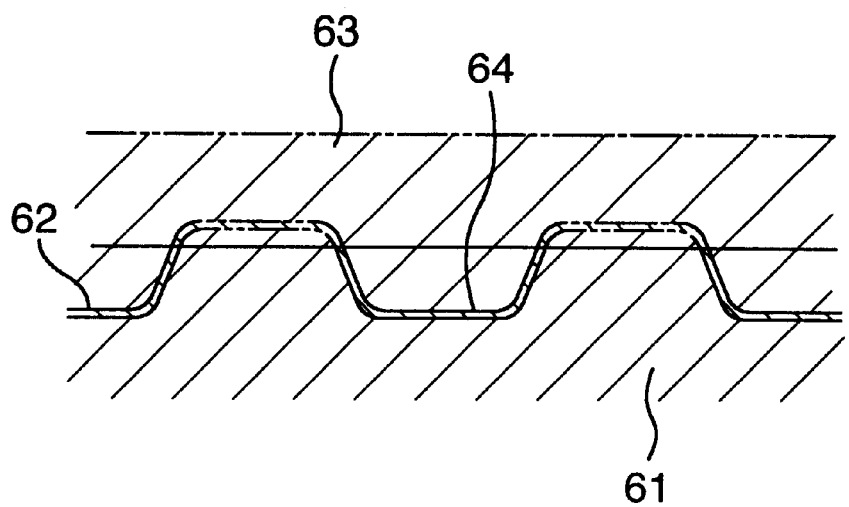
FIG. 8 is an enlarged, cross-sectional view of a portion of a conventional bearing.
Figure 9:
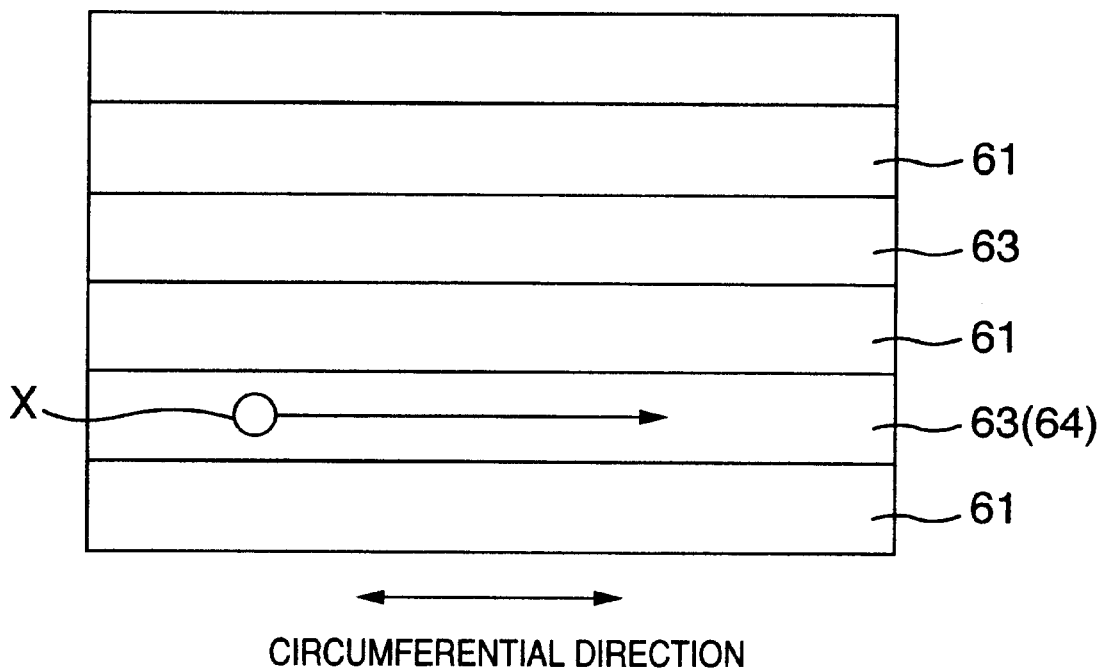
FIG. 9 is an enlarged plan view of a portion of the conventional bearing.

(1) In the above embodiment, although the protrusion having the shape of a square with sides of 0.1 mm is illustrated, the protrusion may have another shape as long as the foreign particle X moves along a side edge and then leaves the side edge again. Thus, the shape of the protrusion is not limited to a square one. FIG. 6 shows a protrusion in a rectangular bank shape. FIG. 7 shows a protrusion having a substantial oblique side edge, for example. The protrusion may have a shape of a triangle, pentagon, or the like.

(2) In the above embodiment, although the sliding surface is covered with the overlay layer 4 made of a lead-tin alloy for example, the inner surface may be finished by machining so as to expose the bearing alloy layer 2 and the overlay layer 4 in stripes.

(3) In the above embodiment, although the depth of etching in connection with the bearing alloy layer 2 is 20 μm for example, the etching depth may be modified within the range of from 5 to 50 μm by changing the etching condition.

What is claimed is:

1. A plain bearing of a cylindrical or half cylindrical shape, comprising:

a back metal;

a bearing alloy layer provided on the inner surface of the back metal, having a plurality of protrusions formed on the inner surface thereof; and an overlay layer provided on the inner surface of the bearing alloy layer so as to cover the protrusions and to fill a recess portion formed between the protrusions; wherein the protrusions are arranged in a grid pattern on the inner surface of the bearing alloy layer such that each protrusion is completely surrounded by a recess groove, so that a foreign particle is prevented from continuing to move straight in the circumferential direction of the plain bearing between the inner surface of the plain bearing and a mating shaft.

2. The plain bearing according to claim 1, wherein the grid pattern is oblique with respect to the circumferential direction of the plain bearing.

3. A plain bearing of a cylindrical or half cylindrical shape, comprising:

a back metal;

a bearing alloy layer provided on the inner surface of the back metal, having a plurality of protrusions formed on the inner surface thereof; and an overlay layer provided on the inner surface of the bearing alloy layer so as to cover the protrusions and to fill a recess portion formed between the protrusions; wherein the protrusions are arranged in a grid pattern on the inner surface of the bearing alloy layer so that a foreign particle is prevented from continuing to move straight in the circumferential direction of the plain bearing between the inner surface of the plain bearing and a mating shaft, wherein the grid pattern is oblique with respect to the circumferential direction of the plain bearing, and the oblique angle of the grid pattern is about 45° with respect to the circumferential direction of the plain bearing, and the pitch of the grid pattern is about 0.15 mm.

4. The plain bearing according to claim 3, wherein each of the protrusions is formed in a square shape of which sides are oblique with respect to the circumferential direction of the plain bearing.

5. The plain bearing according to claim 4, wherein the oblique angle of each side of the square is about 45° with respect to the circumferential direction of the plain bearing, and the length of each side of the square is about 0.1 mm.

6. The plain bearing according to claim 3, wherein each of the protrusions is formed in a circular shape.

7. A plain bearing of a cylindrical or half cylindrical shape, comprising:

a back metal;

a bearing alloy layer provided on the inner surface of the back metal, having a plurality of protrusions formed on the inner surface thereof; and an overlay layer provided on the inner surface of the bearing alloy layer so as to cover the protrusions and to fill a recess portion formed between the protrusions; wherein the protrusions are arranged in a grid pattern on the inner surface of the bearing alloy layer so that a foreign particle is prevented from continuing to move straight in the circumferential direction of the plain bearing between the inner surface of the plain bearing and a mating shaft, and each of the protrusions is formed in a rectangular shape of which sides are oblique at about 45° with respect to the circumferential direction of the plain bearing.

\* \* \* \* \*